United States Patent
Boodman et al.

(10) Patent No.: US 8,601,468 B1
(45) Date of Patent: Dec. 3, 2013

(54) WEB-BASED APPLICATIONS USING WEB EXTENTS

(75) Inventors: Aaron Boodman, San Francisco, CA (US); Erik Kay, Belmont, CA (US); Rafael Weinstein, San Francisco, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 13/110,892

(22) Filed: May 18, 2011

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
*G06F 9/45* (2006.01)

(52) U.S. Cl.
USPC ............ 717/178; 717/176; 717/177; 715/781

(58) Field of Classification Search
USPC ...................... 717/178, 176, 177, 78; 715/781
See application file for complete search history.

(56) References Cited

U.S. PATENT DOCUMENTS

2007/0174824 A1* 7/2007 Relyea et al. ................. 717/140
2008/0184157 A1* 7/2008 Selig ............................. 715/781

* cited by examiner

*Primary Examiner* — Chameli C. Das
*Assistant Examiner* — Duy Khuong Nguyen
(74) *Attorney, Agent, or Firm* — Brake Hughes Bellermann LLP

(57) ABSTRACT

According to one general aspect, a computer-implemented method may include sending, from a computing device to a server, a request to install a web-based application on the computing device. In various embodiments, the method may also include receiving, from the server, an installation procedure for the web-based application. In some embodiments, the installation procedure may include installing the web-based application on the computing device. The procedure may also include specifying a web extent for the web-based application. In various embodiments, the web extent may include a first web origin for the web-based application, and a second web origin for the web-based application.

17 Claims, 7 Drawing Sheets

```
                                                    ┌─ 200
                                                    ↙
          {
          "name":"News app",
          "version":"1",
210 ─── "web_extent":{
220 ─── "origin":"http://www.nytimes.com",
230 ─── "paths":["photos/"] ["headlines/"],
240 ─── "origin2":"http://www.latimes.com",
250 ─── "paths2": ["slide_shows/"] ["breaking_news"]
          }
          }
```

FIG. 2A

```
                                                    ┌─ 260
                                                    ↙
          {
          'name':"NY Times Food app",
          "version": "2"
270 ─── "web_extent": {
280 ─── "origin": "http://www.nytimes.com',
290 ─── "paths": ["food/"] ["headlines/"]
          }
          }
```

FIG. 2B

```
{
  "name": "Video app",
  "version": "1",
  "web_extent": {
  "origin": "http://www.youtube.com",
  "paths": ["new/"] ["popular/"],
  "origin2":"http://videos.google.com",
  "paths2":['recent/'] ["top_rated/"],
  "browse_extent": "http://www.youtube.com/shared"
  }
}
```

FIG. 3A

```
{
  "name": "YouTube app",
  "version": "2",
  "web_extent": {
  "origin": "http://www.youtube.com",
  "paths": ["all_content/"],
  "browse_extent":"http://www.youtube.com/shared"
  }
}
```

FIG. 3B

```
{
  "name": "Video app",
  "version": "1",
  "web_extent": {
  "origin": "http://www.youtube.com",
  'paths": ["new/"] ["popular/"],
  "origin2":"http://videos.google.com",
  "paths2": ["recent/"] ["top_rated/"]
  },
  "permissions":[
  "unlimited-storage",
  "notifications"
  ]
}
```

FIG. 4

WEB-BASED APPLICATIONS USING WEB EXTENTS

CROSS REFERENCE TO RELATED APPLICATIONS

This application claims the benefit, under 35 U.S.C. §119, of U.S. Provisional Patent Application No. 61/345,999 (titled "Installable Web Applications"), U.S. Provisional Patent Application No. 61/346,000 (titled "Web Store for Digital Goods"), and U.S. Provisional Patent Application No. 61/346,013 (titled, "Chrome Extensions"), all filed May 18, 2010. The disclosures of these provisional patent applications are incorporated herein by reference in their entirety.

TECHNICAL FIELD

This application relates, in general, to web-based applications.

BACKGROUND

Use of the Internet and the World Wide Web continues to grow at a rapid pace. This growth is due, in part, to an increase in availability of data networks that may be used to access the Internet and the World Wide Web by computing device users. For instance, in addition to using conventional wired networks, computing device users may access the Internet and the World Wide Web through Wi-Fi hotspots and various types of wireless data networks, among a number of other possible approaches. These data access networks (e.g., for accessing the Internet and World Wide Web) continue to become more readily available and provide ever increasing data bandwidth capabilities. The variety of user computing devices that users may employ to connect with such data access networks continues to increase as well. Such devices may include personal computers, laptops computers and mobile computing devices (such as cellular phones, smartphones and tablet computers), as well as a number of other devices.

The increase in availability of data network access networks, the corresponding increase in the capabilities of those networks and the increased variety of user computing devices have, at least in part, allowed for changes in how users interact with their computing devices. One such change is the advent of the web-based applications as compared to native applications, where all of the content and functionality of an application is located on the user's computing device.

Generally, a web-based application is an application that is run within a Web browser on a computing device. Such web-based applications include both a client-side component (on the user device) and a server-side component (e.g., on a website corresponding with the web-based application).

Depending on the particular application, the client-side component may include only a brief description of the application, with the functionality of the web-based application being controlled by the server-side component, such as using code that is executable by a web browser, such as HTML, HTML5 and/or JavaScript, among a number of other alternatives.

For other web-based applications, the client-side component may include a description of the application, as well as code that is executable by a web browser of the computing device to provide functionality for the web-based application. In such an approach, the server-side component may be used to provide content (e.g., photos, videos, text, and audio) that is used by the web-based application (e.g., accessed by the client-side component). In such approaches, the functionality of the client-side component may be implemented in browser executable code, such as the examples provided above Current approaches for implementing web-based applications, however, limit the flexibility that developers of such applications have in associating server-side content with the client-side component of web-based applications. This lack of flexibility, in turn, may limit the features and functionality that a developer may include in a web-based application.

SUMMARY

According to one general aspect, a computer-implemented method may include sending, from a computing device to a server, a request to install a web-based application on the computing device. In various embodiments, the method may also include receiving, from the server, an installation procedure for the web-based application. In some embodiments, the installation procedure may include installing the web-based application on the computing device. The procedure may also include specifying a web extent for the web-based application. In various embodiments, the web extent may include a first web origin for the web-based application, and a second web origin for the web-based application.

According to another general aspect, a computer-implemented method may include receiving, at a server, a request for installation of a web-based application on a computing device. In various embodiments, the method may also include sending, from the server to the computing device, an installation procedure for the web-based application. In some embodiments, the installation procedure may include installing the web-based application on the computing device, and specifying a web extent for the web-based application. In various embodiments, the web extent may include a first web origin for the web-based application, and a second web origin for the web-based application.

According to another general aspect, a recordable storage medium may have recorded and stored thereon instructions that, when executed by a computing device, cause the computing device to implement a web-based application. In various embodiments, implementing the web-based application may include specifying a web extent for the web-based application. In one embodiment, the web extent may include a first web origin for the web-based application, and a second web origin for the web-based application. In some embodiments, the implementing may include applying features of the web-based application for content within the web extent.

The details of one or more implementations are set forth in the accompanying drawings and the description below. Other features will be apparent from the description and drawings, and from the claims.

A system and/or method for web-based applications, substantially as shown in and/or described in connection with at least one of the figures, as set forth more completely in the claims.

BRIEF DESCRIPTION OF THE DRAWINGS

FIGS. 2A and 2B are code listings for specifying web extents for web-based applications in accordance with an example embodiment.

FIGS. 3A and 3B are code listings for specifying web extents and browse extents for web-based applications in accordance with example embodiments.

FIG. 4 is a code listing for defining a web extent and permissions for a web-based application in accordance with an example embodiment.

Like reference symbols in the various drawings indicate like elements.

DETAILED DESCRIPTION

Figure 1:
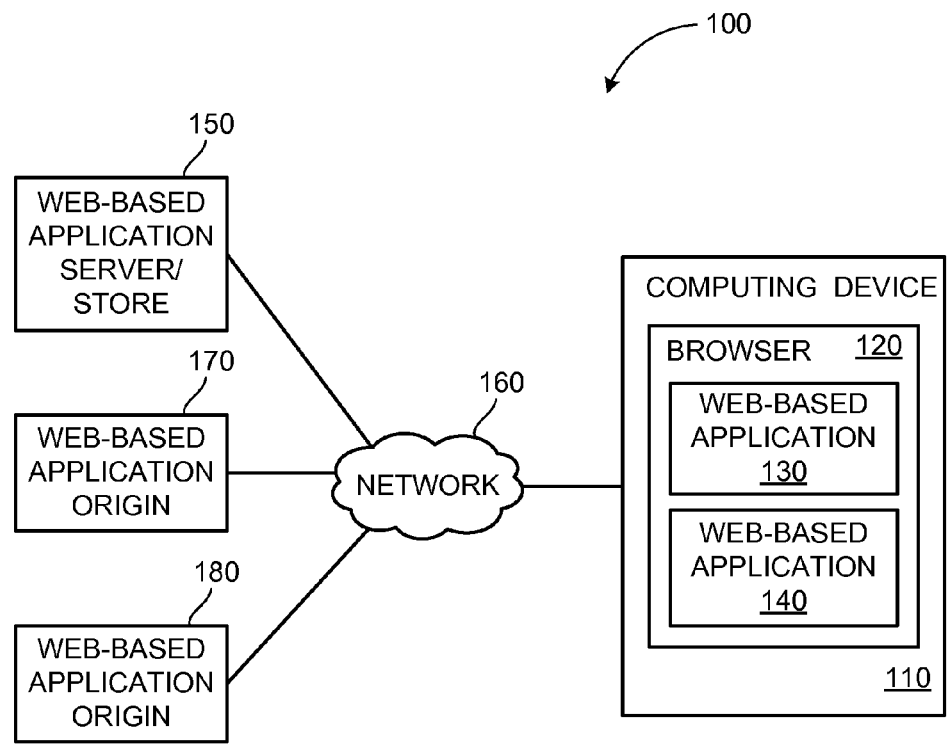
FIG. 1 is a block diagram illustrating a network in accordance with an example embodiment.

FIG. 1 is a block diagram of a computing network 100 in accordance with an example embodiment. The network 100 may be used to implement web-based applications using the techniques described herein. The network 100 is shown by way of example. It will be appreciated that other network configurations may be used for implementing such techniques.

The network 100 includes a user computing device 110. The computing device 110 may take the form of a number of different devices, such as a personal computer, laptop computer, tablet computer, netbook computer, or a web-enabled phone, as some examples. The computing device 110 includes a browser 120 that may be used to access various types of content. Such content may include web sites, photos, video, audio and executable scripts, as some examples. As shown in FIG. 1, the browser 120 includes web-based application 130 and web-based application 140, which may be installed on the computing device 110 using the techniques described herein and, once installed, may operate as an integrated part of the browser 120. The web-based applications 130 and 140 may include respective client-side components of those applications. Depending on the particular embodiment, the web-based applications 130 and 140 may include a description of the web-based application and/or code that is executable by the browser 120, where that code provides functionality for the respective web-based application.

In the network 100, the computing device 110 is coupled with a network 160. The network 160 may include a data access network that provides access to the Internet and/or the World Wide Web. Via the network 160, the computing device 110 (using the browser 120) may communicate with a web-based application server/store 160, a first web-based application origin 170 and a second web-based application origin 180. In this example, the web-based application origins may comprise server-side components for the web-based applications 130 and 140. As is discussed in further detail below, the web-based applications 130 and 140 may operate using multiple web origins. Therefore, the web-based applications 130 and 140 may have server-side components on both of the web-based application origins 170 and 180 (e.g., may use content from both origins).

In one embodiment, the web-based application server/store 150 may be configured to receive requests from user computing devices (such as the computing device 110) for installation of web-based applications and to provide, in response to such requests, installation procedures (or installation packages) for the web-based applications. Such installation procedures/packages may include, at least, the client-side component for a requested web-based application.

In the arrangement shown in FIG. 1, the browser 120 may be used to request installation of the web-based applications 130 and 140 by interacting with the web-based application server/store 150. For instance, the web-based application server/store 150 may implement a website that is used to distribute web-based applications, among other content. For example, the web-based application server/store 150 may implement an e-commerce site. In such an approach, requests to install web-based applications may be included in messages from the computing device 110 to the web-based application server/store 150 that indicate agreement to purchase respective web-based applications. In other embodiments, the web-based application server/store 150 may take other forms or implement other techniques, such as providing access to free web-based applications, or may take the form of a developer's website which provides access to web-based application installation procedures/packages.

The specific actions performed when installing a web-based application may vary depending on the particular embodiment and/or the particular web-application. In an example embodiment, installing a web-based application may include installing an icon that corresponds with the web-based application in an application launcher area of a web browser application. A user may then interact with this icon to launch the web-based application. In another example embodiment, installing a web-based application may include synchronizing the web-based application across multiple computers that a user access (e.g., with the same login credentials).

In other embodiments, installing a web-based application may include starting a background page for the web-based application, if it the web-based application includes a background page feature. A background page of a web-based application may enable the web-based application to run as soon as the user logs into their computer, including before the user launches a web browser application or launches the associated web-based application in the web browser application. A background page may an invisible element running in a browser application, where the background page includes a declared association, in the web browser application, with the installed web-based application.

While the network 100 shows only a single web-based application server/store 150, it will be appreciated that additional web-based application servers/stores may be included in the network 100. Also, in some embodiments, the web-based application origins 170 and 180 may also implement one or more websites that the computing device 110 (e.g., using the browser 120) may interact with to request installation of web-based applications, such as the web-based applications 130 and 140.

FIGS. 2A and 2B (collectively "FIG. 2") are code listings 200 and 260 that may be used to define "web extents" for web-based applications in accordance with an example embodiment, where each of the code listings corresponds to a respective web-based application. For instance, the code listing 200 in FIG. 2A may correspond with the web-based application 130 of FIG. 1, while the code listing 260 shown in FIG. 2B may correspond with the web-based application 140 of FIG. 1. The syntax of the code listings 200 and 260 in FIG. 2 (as well as the code listings shown in FIGS. 3A, 3B and 4) is provided by way of example and for purposes of illustration, and other approaches may be used for such code listings.

The code listings 200 and 260 specify respective "web extents" for each of the corresponding web-based applications. As described herein, a "web extent" may be used to define a web space (e.g., Uniform Resource Locator (URL) space) where web content (server-side content) for use with a given web-based application is located. Content that is available in the specified web space may be referred to as being within the web extent of the particular web-based application.

Referring to FIG. 2A, the code listing 200 corresponds with a web-based application with a name "News app" and a version of "1." As noted above, and for purposes of this discussion, the code listing 200 may correspond with the web-based application 130 shown in FIG. 1. Referring to FIG. 2B, the code listing 260 corresponds with a web-based application with a name "NY Times Food app" and a version of "2." As noted above, and for purposes of this discussion, the code listing 260 may correspond with the web-based application 140 shown in FIG. 1.

The code listing 200 specifies a web extent 210 for the "News app." The web extent 210 in the code listing 200 specifies a first web origin 220, which is a URL for the New York Times web site. It will be appreciated that the code listing 200 may include other items than those shown in FIG. 2A, such as the items described herein and/or functional content. The web extent 210 further specifies multiple paths 230 ("photos/" and "headlines/") that correspond with the web origin 220. The paths 230, used in conjunction with the web origin 220, further specify the URL space that constitutes the web extent 210 for the web-based application 130. The web extent 210 in the code listing 200 also specifies a second web origin (origin2) 240, which is a URL for the Los Angeles Times web site. The web extent 210 further specifies multiple paths (paths2) 250 ("slide shows/" and "breaking news/") that correspond with the web origin 240. The paths 250, used in conjunction with the web origin 240, still further specify the URL space that constitutes the web extent 210 for the web-based application 130.

The code listing 260 specifies a web extent 270 for the "NY Times Food app." The web extent 270 in the code listing 260 specifies a web origin 280, which is the URL for the New York Times web site, thus the same as the origin 230 in the code listing 200 shown in FIG. 2A. It will be appreciated that the code listing 260 may include other items than those shown in FIG. 2A. The web extent 270 further includes multiple paths 290 ("food!" and "headlines/") that correspond with the web origin 280. The paths 290, used in conjunction with the web origin 280, further specify the URL space that constitutes the web extent 270 for the web-based application 140.

As shown in FIGS. 2A and 2B, the respective web extents 210 and 270 both include the URL for the NY Times website as a web origin, thus share an origin. Further, the web extent 210 includes multiple origins and multiple respective paths for each origin. Thus, using web extents to specify the web space (URL space) for web-based applications provides developers of those applications significant flexibility in how they organize web-based applications, as well as how they specify the web content that is available to a given web-based application. For instance, using web extents allows developers to specify many to many relationships between apps and origins. The ability to specify such many to many relationships allows a single web origin to correspond with more than one web-based application. Further, using web extents allows a single web-based application to have more than one origin (thus allowing for a larger web (URL) space for the web-based application). Previous approaches for web-based applications did not provide such flexibility as they required one to one relationships between web-based applications and origins.

In an example embodiment, navigating to a URL that is within a web-based application's web extent results in the features and permissions, such as described herein, of the web-based application being applied for content located at that URL, regardless of how the URL is navigated to. In such an approach, a URL within a web-based application's web extent may be navigated to using the web-based application when it is being executed on a computing device. Alternatively, URLs within a web-based application's browse extent could be navigated to by following a link or clicking a bookmark when the web-based application is not being executed on the computing device. In such a situation, navigating to a link (e.g., using a browser) that is within a web extent of a given web-based application may result in the browser of the computing device launching the corresponding web-based application, so that the features and permissions of the web-based application may be used for content at the URL that was navigated to.

FIGS. 3A and 3B (collectively "FIG. 3") are code listings 300 and 350 for specifying web extents and "browse extents" for web-based applications in accordance with an example embodiment, where each of the code listings corresponds to a respective web-based application. For instance, the code listing 300 in FIG. 3A may correspond with the web-based application 130 of FIG. 1, while the code listing 350 shown in FIG. 3B may correspond with the web-based application 140 of FIG. 1. As noted above, the syntax of the code listings 300 and 350 in FIG. 3 is provided by way of example and for purposes of illustration, and other approaches may be used for such code listings.

The code listings 300 and 350, in addition to specifying web extents for the corresponding web-based application, specify respective "browse extents" for each of the corresponding web-based applications. As described herein, a "browse extent" may be used to define a web space (e.g., URL space) where web content that a developer wishes to be shared by multiple web-based applications is located. Content that is available in the specified web space for a browse extent may be referred to as being within the browse extent of the particular web-based application. In an example embodiment, browsing to content that is within the browse extent of a web-based application would not result in the web-based application being launched (e.g., by a browser of a computing device on which the web-based application is installed). However, if content within a browse extent is browsed to using the corresponding web-based application, that content may be treated as being within the web extent of the web-based application, such as in the manners described herein. Such an approach may be used for URLs that are commonly shared across multiple web applications, such as common login/authentication pages or common support/help center pages, as two examples.

Referring to FIG. 3A, the code listing 300 corresponds with a web-based application with a name "Video app" and a version of "1." As noted above, and for purposes of this discussion, the code listing 300 may correspond with the web-based application 130 shown in FIG. 1. Referring to FIG. 3B, the code listing 360 corresponds with a web-based application with a name "YouTube app" and a version of "2."

As noted above, and for purposes of this discussion, the code listing 350 may correspond with the web-based application 140 shown in FIG. 1.

The code listing 300 specifies a web extent 305 for the "Video app." The web extent 305 in the code listing 300 specifies a first web origin 310, which is a URL for the YouTube web site. It will be appreciated that the code listing 300 may include other items than those shown in FIG. 3A, such as the items described herein and/or functional content. The web extent 305 further specifies multiple paths 315 ("new/" and "popular/") that correspond with the web origin 310. The paths 315, used in conjunction with the web origin 310, further specify the URL space that constitutes the web extent 305 for the web-based application 130 in this example. The web extent 305 in the code listing 300 also specifies a second web origin (origin2) 320, which is a URL for the Google Videos web site. The web extent 305 further specifies multiple paths (paths2) 325 ("recent/" and "top_rated/") that correspond with the web origin 320. The paths 325, used in conjunction with the web origin 320, still further specify the URL space that constitutes the web extent 305 for the web-based application 130 in this example.

The code listing 300 also specifies a browse extent 330 for the Video app (web-based application 130 in this example) of FIG. 3A. The browse extent 330 is a URL ("shared/") that is within the YouTube website domain. In this situation, browsing to content that is within the browse extent 330 would not result in the browser 120 of the computing device 110 launching the web-based application 130 (i.e., if the application was not already launched). However, if the web-based application 130 was previously launched and the web-based application 130 is used to browse to content within the browse extent 330, that content may be treated as being with the web extent of the web-based application 130.

The code listing 350 specifies a web extent 360 for the "YouTube app" (web-based application 140 in this example). The web extent 360 in the code listing 350 specifies a web origin 370, which is the URL for the YouTube web site, thus the same web origin as the web origin 310 in the code listing 300. It will be appreciated that the code listing 350 may include other items than those shown in FIG. 3B. The web extent 370 further includes a path (paths) 380 ("all content/") that corresponds with the web origin 370. The path 380, used in conjunction with the web origin 370, further specifies the URL space that constitutes the web extent 360 for the web-based application 140.

The code listing 350 also specifies a browse extent 390 for the YouTube app of FIG. 3B. The browse extent 330 is the same as the browse extent 330 in the code listing 300 shown in FIG. 3A. In this situation, content within the browse extents 330 or 390, that content would not result in the browser 120 of the computing device 110 launching either of the corresponding web-based applications. However, if either of the web-based applications 130 and 140 were previously launched and are used to browse to the content within the browse extent, that content may be treated as being with the web extent of the web-based application that is used to access it.

In such approaches, the respective installation procedures (or packages) for each web-based application may provide for specifying the respective browse extents for each web-based application. In other approaches, a given web-based application may have a browse extent that includes multiple URLs. In still other approaches, URLs within a given web-based applications browse extent may be shared with more than one other web-based application, thus providing even more flexibility for web-based application developers.

Launching a web-based application may be accomplished and manifested in a number of different ways. For instance, in addition to following a link that is within a web-based application's web extent, a web-based application may be launched by interacting with an icon that is associated with the web-based application. When a web-based application is launched, a number of different outcomes may be manifested on a computing device on which the web-based application is launched. For example, the web-based application may be rendered in a dedicated browser tab. The dedicated browser tab may be different in appearance and behavior than other tabs of the browser. For instance, the dedicated browser tab may display a larger icon, have different tab placement and/or have different grouping behavior than other browser tabs. In other embodiments, the web-based application may be rendered in a dedicated window (e.g., with a different frame and behavior than other windows, and may be treated as a top level application to an operating system of the computing device with a separate taskbar/dock entry). In other example embodiments, a web-based application may be launched as a widget or panel (e.g., a media player or chat program), launched as a full screen app (e.g., a presentation or game), or launched as an invisible service.

In other embodiments, a URL launch handler may be used to launch web-based applications. In such an approach, the URL launch handler may provide the web-based applications with the option of handling navigation to a URL within their web extent using custom logic. For example, such custom logic may provide for situations where a web-based application is running in a web browser application and the web based application wants to open a document at a URL within its web extent within an existing tab, rather than launching a second instance of the web-based application. As another example, a URL launch handler may be used to initiate a chat session with a particular user within an already running web-based chat application. Alternatively, if such a web-based chat application is not already running, the URL launch handler may handle a URL for initiating a chat session with a particular user by first launching the main web-based chat application URL and then handling the requested chat session URL to launch the chat session with the particular user.

FIG. 4 is a code listing 400 for defining a web extent and local permissions for a web-based application in accordance with an example embodiment. The code listing 400 corresponds to a respective web-based application. For instance, the code listing 400 may correspond with the web-based application 130 or the web-based application 140 of FIG. 1. As noted above, the syntax of the code listing 400 is provided by way of example and for purposes of illustration, and other approaches may be used for such code listings.

The code listing 400, in addition to specifying a web extent for the corresponding web-based application, also specifies local permissions 450 for the corresponding web-based application. These local permissions may be applied to allow access to local resources of a computing device (e.g., the computing device 110) for content that is within the web extent specified in FIG. 4, where content that is not within the web extent would not be allowed such access.

The code listing 400 corresponds with the web-based application that was discussed above with respect to FIG. 3A. Accordingly, the code listing 400 specifies the same name, version and web extent as specified in FIG. 3A. As with the code listings in FIGS. 2 and 3, it will be appreciated that the code listing 400 may include other items than those shown in FIG. 3, such as the items described herein and/or functional content.

As shown in FIG. 4, the code listing 400 specifies a web extent for the "Video app" that includes a first web origin 410, which is a URL for the YouTube web site. The web extent of FIG. 4 further specifies multiple paths 420 ("new/" and "popular/") that correspond with the web origin 410. The paths 420, used in conjunction with the web origin 410, further specify the URL space that constitutes the web extent for the web-based application of FIG. 4. The web extent of the code listing 410 also specifies a second web origin (origin2) 430, which is a URL for the Google Videos web site. The web extent of the code listing 400 further specifies multiple paths (paths2) 440 ("recent!" and "top_rated!") that correspond with the web origin 430. The paths 440, used in conjunction with the web origin 430, still further specify the URL space that constitutes the web extent for the web-based application in this example.

The code listing 400 also specifies local permissions 450 for the Video app of FIG. 4. The local permissions 450 include an unlimited-storage permission 450 and a notifications permission 470, though such an approach could be used to specify other permissions. As is described in further detail below with respect to FIG. 5, the local permissions 450 may be applied for content that is within the web extent specified in the code listing 400.

Figure 5:
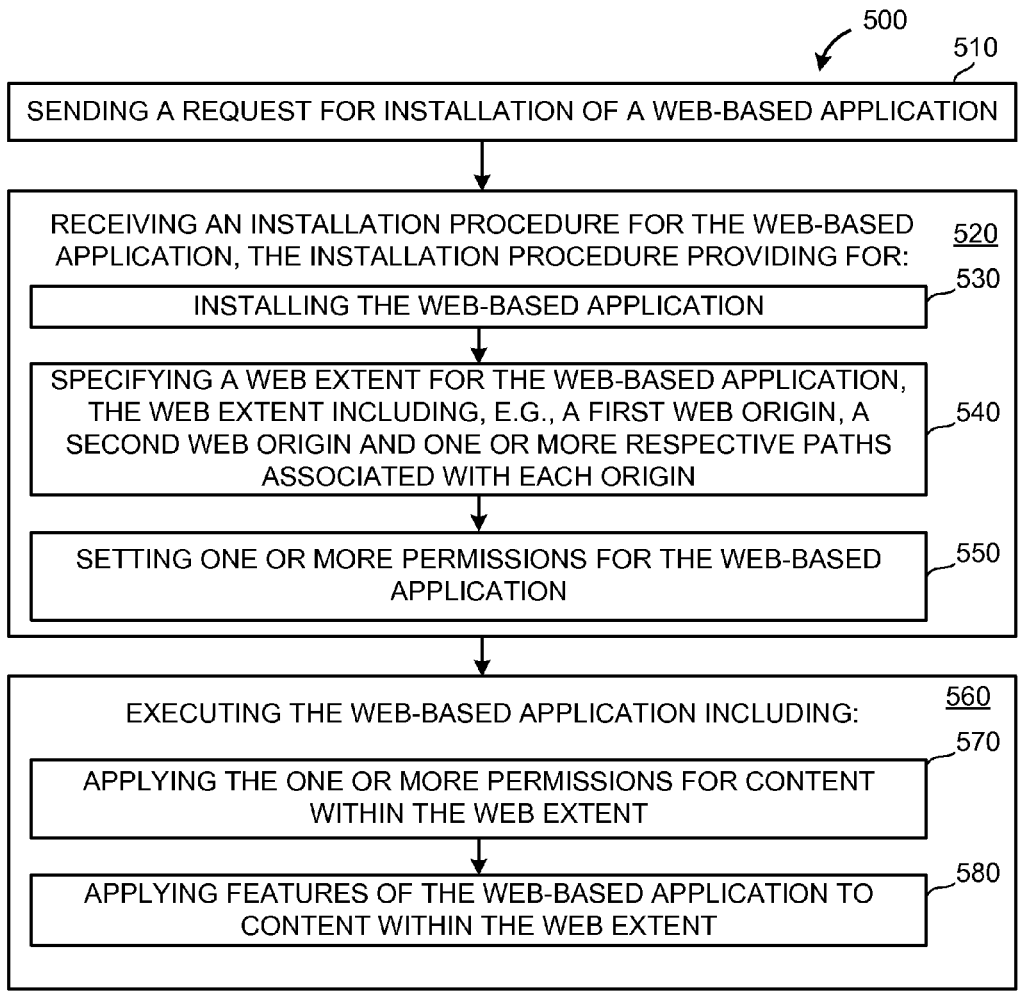
FIG. 5 is a flowchart illustrating a computer-implemented method for implementing a web-based application in accordance with an example embodiment.

FIG. 5 is a flowchart illustrating a computer-implemented method 500 for implementing a web-based application in accordance with an example embodiment. The method 500 may be implemented in the network 100 illustrated in FIG. 1 and by using the techniques illustrated in FIGS. 2-4. Accordingly, for purposes of illustration, the method 500 will be described with further reference to FIGS. 1-4, as appropriate. It will be appreciated, however, that the method 500 may be implemented in other network configurations and by using other appropriate techniques (e.g., for specifying web extents, browse extents and permissions).

As shown in FIG. 5, the method 500 includes, at block 510, sending a request for installation of a web-based application. With reference to FIG. 1, the request may be sent from the browser 120 of the computing device 100 to the web-based application server/store 150 using a number of different approaches. For instance, as previously discussed, the request may be included in a message that indicates a user's agreement to purchase a web-based application through a World Wide Web based (web-based) store, such as by using an e-commerce transaction. In other instances, the request may comprise a request to install a free web-based application, where the web-based application is available through a web-based store or, as one alternative, through a developer's website. Of course, other alternatives for requesting installation of a web-based application may be used.

The method 500 further includes, at block 520, receiving (in response to the request) an installation procedure (or package) for the web-based application. As shown in block 520 of the method 500, the installation procedure may provide for, at block 530, installing the web-based application on a user computing device (e.g., installing the client-side component). As previously discussed, the installation at block 530 may include placing (installing), on the user's computing device, at least one of a description of the web-based application and browser-executable code that provides functionality for the web-based application. In the method 500, the operations of blocks 540 and 550 are shown as being separate from the installation operation of block 530. It will be appreciated, however, that, depending on the particular embodiment, the operations at blocks 540 and/or 550 may be included as part of the installation operation of block 530.

The method 500, as illustrated in FIG. 5, includes, at block 540, specifying a web extent for the web-based application. At block 540, the web extent may be specified using the techniques described herein, such as those illustrated in, and described with respect to FIGS. 2-4, for example. As discussed herein, the web extent for a web-based application may include multiple web origins, which may take the form of URLs, where websites or web pages at those URLs include content that may be used by the web-based application. Further, the web extent may also include one or more respective paths for each origin, where the paths, in combination with their respective origin, further specify locations for web content that is within the web extent of the application (e.g., the paths may be used in conjunction with URLs (web origins) to define additional URLs that are web pages or websites that correspond with the web origin and are within the web extent of the web-based application). Examples of such an approach are illustrated and described above with respect to FIGS. 2-4.

At block 550, the method 500 includes, setting one or more local permissions for the web based application. The local permissions set at block 550 may include a number of different permissions that relate to the web-based application's ability to access local resources of a user's computing device (e.g., local storage and system notifications) for content within the web application's web extent, where those resources would be otherwise protected from access by web content (e.g., scripts) that is not within the web-based application's web extent. As indicated above, the local permissions may be set at the time the web-based application is installed. In other embodiments, the local permissions could be set when the web-based application is launched (e.g., at run time), such as by prompting the user as to which local permission to grant to the web-based application.

The method 500 further includes, at block 560, executing the web-based application that was installed at block 520 (e.g., with the operations of block 530, 540 and/or 550). Executing the web-based application, at block 560, includes, at block 570, applying the one or more local permissions for content that is within the web extent. Using the above example of an unlimited storage permission, content within the web extent of the web-based application (e.g., content from URLs specified in the web extent) could be saved to local storage (e.g., a hard-disk drive or solid-state drive) of a computing device that is executing the web-based application without any limitations on the amount of content that can be stored, where web content that is not within the web extent would have a limited amount of storage allowed, or could be prohibited from being stored locally, other than in, e.g., dynamic memory. As an example, using the web-based application and local permissions described above with respect to FIG. 4, a user could select content from both web origins 410 and 420 (including content available at URLs specified by the paths 420 and 440), create a playlist that includes that content and save that playlist to a local hard disk drive or solid state drive, such that the playlist would then be available offline.

Figure 6:
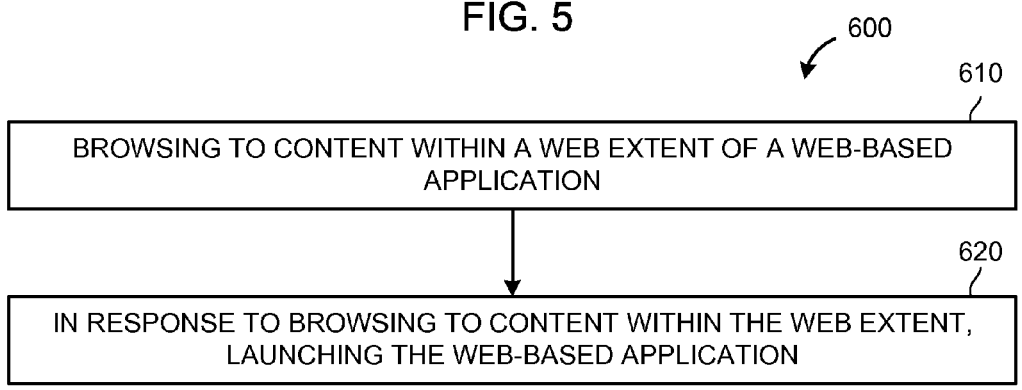
FIG. 6 is a flowchart illustrating a computer-implemented method for launching a web-based application in accordance with an example embodiment.

At block 560, the method 500 further includes, at block 580, applying features of the web-based application to content within the web extent. For instance, if a video streaming application has a web extent that includes multiple web origins, the features of the application may be applied to content associated with both web origins. For instance, a video player that includes features that are not available on video players provided at websites or web pages corresponding with either of the web origins may be used to play videos from both origins. Of course, such an approach may be used with respect to other features of web-based applications and for content other than video files and the foregoing is provided merely by way of example FIG. 6 is a flowchart illustrating a computer-implemented method 600 for launching a web-based application. As was discussed above with respect to FIG. 5, the method 600 may be implemented in the network 100 illustrated in FIG. 1 and by using the techniques illustrated in FIGS. 2-4. Accordingly, for purposes of illustration, the method 600 will also be described with further reference to FIGS. 1-4, as appropriate. It will be appreciated, however, that the method 600 may be implemented in other network configurations and by using other appropriate techniques.

As shown in FIG. 6, the method 600 includes, at block 610, browsing (e.g., using a web browser 120 of a user computing device 110) to content within a web extent of a web-based application. The web-extent for the web-based application may be specified using the techniques described herein, such as those illustrated in, and discussed with respect to FIGS. 2-4, for example. Of course, other approaches for defining a web extent are possible. The method 600 further includes, at block 620, as a result of browsing to the content with the specified web extent of the web-based application, the computing device launching the web-based application. In such an approach, the browsed to content (within the web extent) may then be displayed within the web-based application, e.g., using the features and permissions of the web-based application, such as in the fashions described herein.

Figure 7:
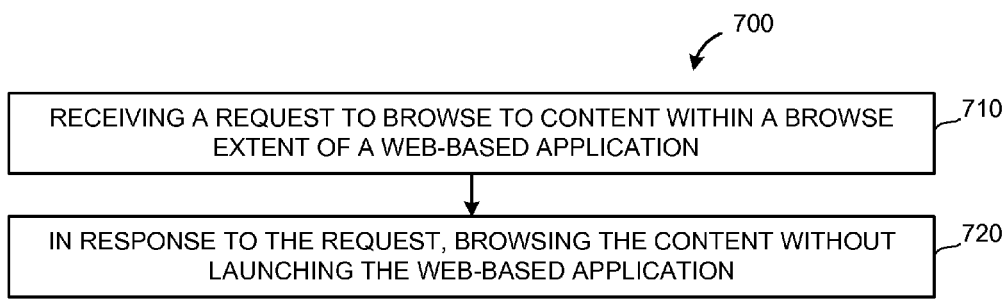
FIG. 7 is a flowchart illustrating a computer-implemented method for browsing content within a browse extent in accordance with an example embodiment.

FIG. 7 is a flowchart illustrating a computer-implemented method 700 for browsing content within a browse extent in accordance with an example embodiment. As was discussed above with respect to FIGS. 5 and 6, the method 700 may be implemented in the network 100 illustrated in FIG. 1 and by using the techniques illustrated in FIGS. 2-4. Accordingly, for purposes of illustration, the method 700 will also be described with further reference to FIGS. 1-4, as appropriate. It will be appreciated, however, that the method 700 may be implemented in other network configurations and by using other appropriate techniques.

The method 700 includes, at block 710, receiving a request to browse to content within a browse extent of a web-based application. As discussed above, a browse extent may be used to specify web locations of content that is shared by multiple web-based applications, where it is desirable that browsing to the shared content outside of one of the multiple web-based applications does not result in a computing device launching any of those web-based applications. Depending on the particular embodiment, the browse extent may, or may not be considered to be within the web extents of the web-based applications.

At block 720, the method 700 includes, in response to the request at block 710, browsing to the content without launching the web-based application (or any other web-based applications that specify the content as being within their browse extent). As discussed above, multiple applications may specify the same browse extent. In such a situation, features and local permissions of the web-based application would not be applied. As discussed above with respect to FIG. 3, each application may specify a browse extent as part of a corresponding installation procedure (or installation package). Such an approach would prevent a request to browse to content that is specified as being within a browse extent resulting in a computing device launching multiple web-based applications that share that content (i.e., within the browse extent).

In embodiments where content that is within a browse extent of a web-based application is considered to be within a web extent of the web-based application, browsing to the content that is within the browse extent from the web-based application, when executing, would allow features and local permissions of the web-based application to be applied to the content that is within the browse extent.

Figure 8:
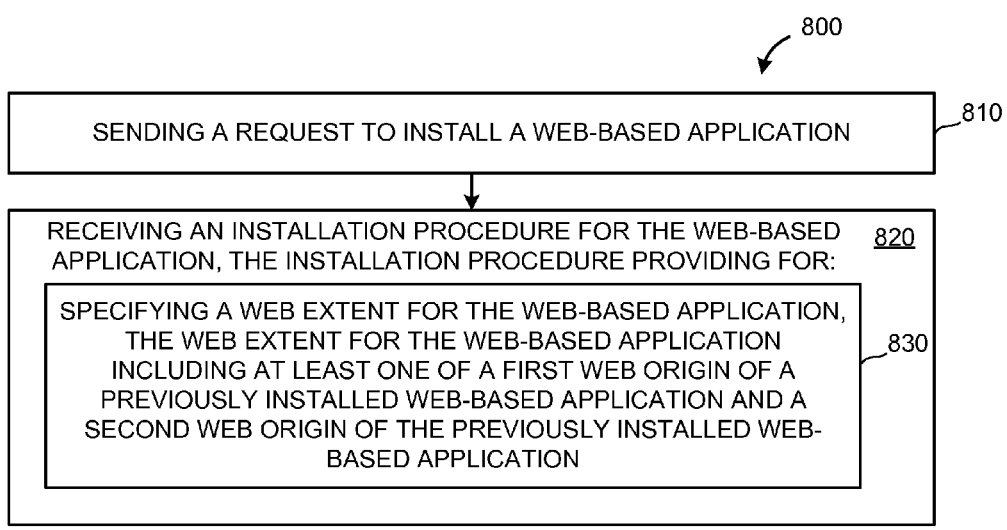
FIG. 8 is a flowchart illustrating a computer-implemented method for implementing a web-based application in accordance with an example embodiment.

FIG. 8 is a flowchart illustrating a computer-implemented method 800 for implementing a web-based application in accordance with an example embodiment. As was discussed above with respect to FIGS. 5-7, the method 800 may be implemented in the network 100 illustrated in FIG. 1 and by using the techniques illustrated in FIGS. 2-4. Accordingly, for purposes of illustration, the method 800 will also be described with further reference to FIGS. 1-4, as appropriate. It will be appreciated, however, that the method 800 may be implemented in other network configurations and by using other appropriate techniques.

The method 800, at block 810, includes sending a request, e.g., from a user computing device to a server, to install a web-based application. The request at block 810 may be sent using the techniques described herein, or by using a number of other appropriate techniques.

At block 820, the method 800 includes, receiving, e.g., at the computing device from the server, an installation procedure for the web-based application At block 830, the installation procedure of block 820 includes specifying a web extent for the web-based application, where the web extent includes at least one of a first web origin and a second web origin of a previously installed web-based application, such as a web-based application that was installed using the method 500 illustrated in FIG. 5. Using the example discussed above with respect to FIGS. 3A and 3B, such an approach may include installing, using the method 500, a first web-based application that specifies a first web extent, such as the web extent 305 shown in FIG. 3A and installing, using the method 800, a second web-based application that specifies a second web extent, such as the web extent 360 shown in FIG. 3B. In such approaches, the installation requests for the first web-based application and the second web-based application may be sent, by a user computing device, to the same server or may be sent to different servers, depending on the particular location of the requested web-based application.

Figure 9:
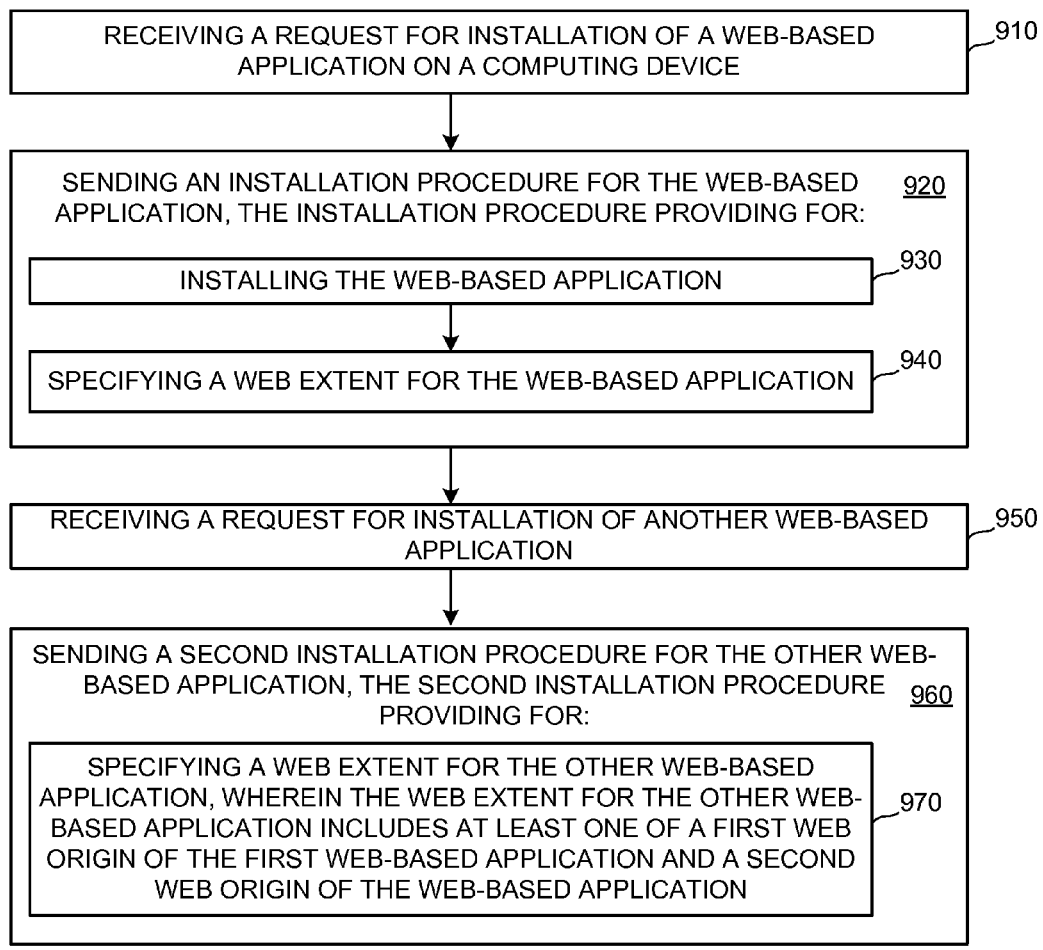
FIG. 9 is a flowchart illustrating a computer-implemented method for implementing web-based applications in accordance with an example embodiment.

FIG. 9 is a flowchart illustrating a computer-implemented method 900 for implementing web-based applications in accordance with an example embodiment. As was discussed above with respect to FIGS. 5-8, the method 900 may be implemented in the network 100 illustrated in FIG. 1 and by using the techniques illustrated in FIGS. 2-4. Accordingly, for purposes of illustration, the method 900 will also be described with further reference to FIGS. 1-4, as appropriate. It will be appreciated, however, that the method 900 may be implemented in other network configurations and by using other appropriate techniques.

The method 900 includes, at block 910, receiving, e.g., at a server, a request for installation of a web-based application on a computing device. As with the methods 500 and 800, this request may be implemented using the techniques described herein, or may be implemented using a number of other appropriate techniques.

At block 920, the method 900 includes sending, from the server to the computing device, an installation procedure for the web-based application. The installation procedure of block 920 provides for, at block 920, installing the web-based application on the computing device. At block 930, the installation procedure of block 920 provides for installation of the web based application on the computing device.

In like fashion as was discussed above with respect to blocks 530-550 of FIG. 5, while blocks 940 is shown separately from block 930, the operations provided for at block 940, depending on the particular embodiment, could be included as part of the installation that is provided for at block 930. In the example embodiment of FIG. 9, at block 940, the method 900 includes specifying a web extent for the web-based application. The web extent at block 940 may be specified using the techniques described herein, such as the approach illustrated in FIG. 2A, for example.

At block 950, the method 900 includes receiving, at the server, a request for installation of another web-based application on the computing device. In like fashion as the request of block 910, the request at block 950 may be implemented using the techniques described herein, or may be implemented using any number of other appropriate techniques.

At block 960, the method includes sending, from the server to the computing device, an installation procedure for the other web-based application. The installation procedure of block 960 provides for, at block 970, specifying a web extent for the other web-based application, where the web extent for the other web-based application includes at least one of a first web origin of the web extent of block 940 and a second web origin of the web extent of block 940.

Figure 10:
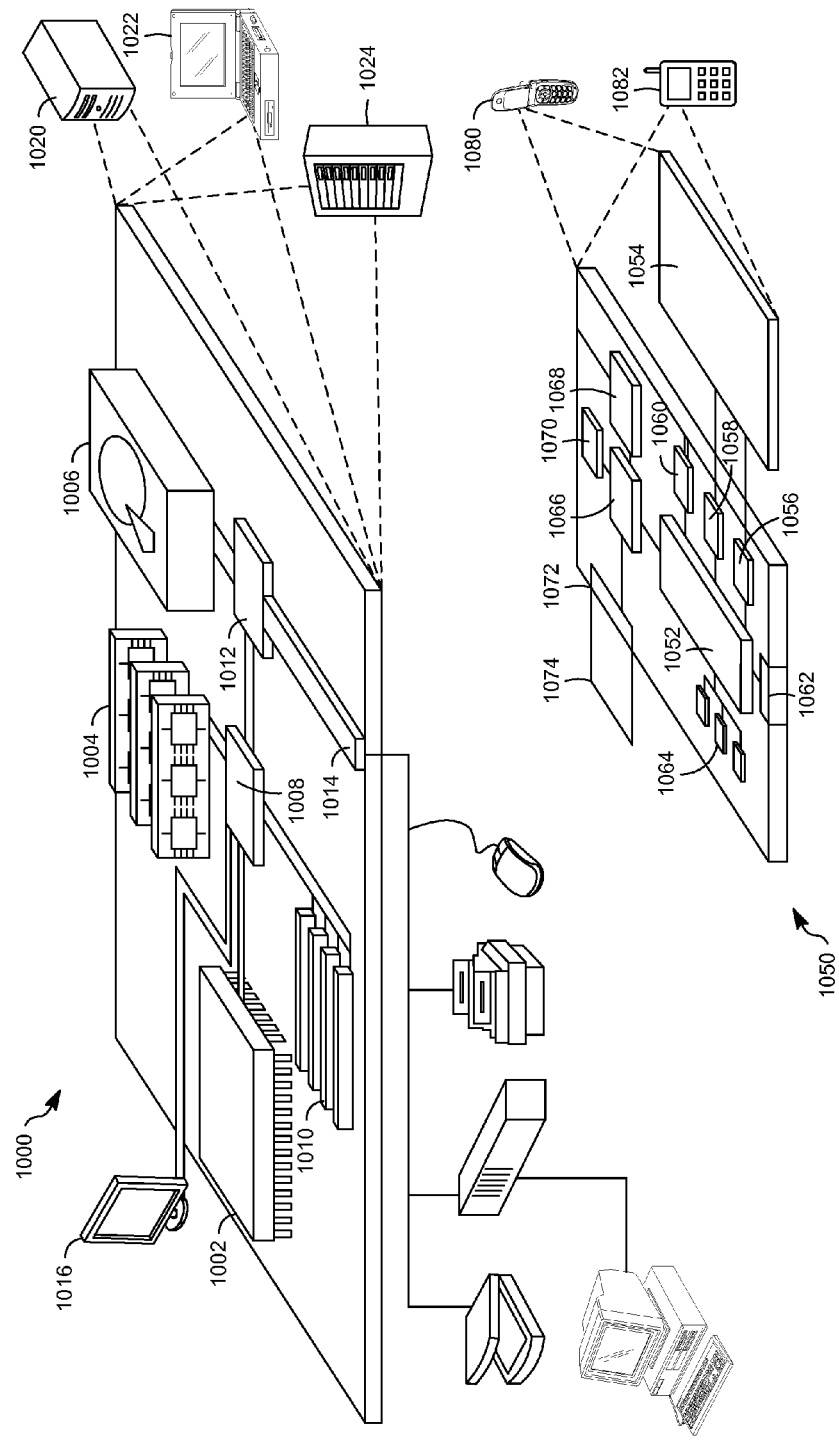
FIG. 10 is a diagram illustrating a computing device and a mobile computing device that can be used to implement the techniques described herein in accordance with an example embodiment.

FIG. 10 is a diagram that shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 752, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, which may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   sending, from a computing device to a server, a request to install a web-based application on the computing device; and
   receiving, from the server, an installation procedure for the web-based application, the installation procedure providing for:
      installing the web-based application on the computing device;
      specifying a web extent for the web-based application, the web extent including:
         a first web origin for the web-based application;
         at least one path associated with the first web origin, the at least one path associated with the first web origin corresponding with respective content, of the first web origin, for use with the web-based application;
         a second web origin for the web-based application; and
         at least one path associated with the second web origin, the at least one path associated with the second web origin corresponding with respective content, of the second web origin, for use with the web-based application.

2. The computer-implemented method of claim 1, wherein:
   the first web origin comprises a first Uniform Resource Locator (URL); and
   the second web origin comprises a second URL.

3. The computer-implemented method of claim 1, wherein browsing, by the computing device, to content within the web extent results in the computing device launching the web-based application.

4. The computer-implemented method of claim 1, wherein the installation procedure further provides for setting, on the computing device, one or more permissions for the web-based application, the method further comprising:
   executing the web-based application including:
      applying, by the computing device, the one or more permissions for content within the web extent.

5. The computer-implemented method of claim 1, wherein, when the web-based application is executed on the computing device, features of the web-based application are applied to content within the web extent.

6. The computer-implemented method of claim 1, further comprising:
   sending, from the computing device to a second server, a request to install another web-based application on the computing device; and
   receiving, from the second server, a second installation procedure for the other web-based application, the second installation procedure providing for:
      specifying a web extent for the other web-based application, the web extent for the other web-based application including at least one of the first web origin of the web-based application and the second web origin of the web-based application.

7. The computer-implemented method of claim 6, wherein the server and the second server are a same server.

8. The computer-implemented method of claim 6, wherein the installation procedure and the second installation procedure each provides for specifying content that is shared between the web-based application and the other web-based application, wherein browsing to the shared content, by the computing device without launching the web-based application or the other web-based application, is performed outside the web-based application and the other web-based application.

9. A computer-implemented method comprising:
   receiving, at a server, a request for installation of a web-based application on a computing device; and
   sending, from the server to the computing device, an installation procedure for the web-based application, the installation procedure providing for:
      installing the web-based application on the computing device;
      specifying a web extent for the web-based application, the web extent including
         a first web origin for the web-based application;
         at least one path associated with the first web origin, the at least one path associated with the first web origin corresponding with respective content, of the first web origin, for use with the web-based application;
         a second web origin for the web-based application; and
         at least one path associated with the second web origin, the at least one path associated with the second web origin corresponding with respective content, of the second web origin, for use with the web-based application.

10. The computer-implemented method of claim 9, wherein:
    the first web origin comprises a first Uniform Resource Locator (URL); and
    the second web origin comprises a second URL.

11. The computer-implemented method of claim 9, wherein, when the web-based application is executed on the computing device, features of the web-based application are applied to content within the web extent.

12. The computer-implemented method of claim 9, wherein the installation procedure further provides for setting one or more local permissions for the web-based application, wherein the one or more local permissions, when executing the web-based application on the computing device, are applied for content within the web extent.

13. The computer-implemented method of claim 9, further comprising:
    receiving, at the server, a request for installation of another web-based application on the computing device; and
    sending, to the computing device, a second installation procedure for the other web-based application, the second installation procedure providing for:
       specifying a web extent for the other web-based application, wherein the web extent for the other web-based application includes at least one of the first web origin and the second web origin.

14. A non-transitory recordable storage medium having recorded and stored thereon instructions that, when executed by a computing device, cause the computing device to:
    implement a web-based application, wherein implementing the web-based application includes:
       specifying a web extent for the web-based application, the web extent including:
          a first web origin for the web-based application;
          at least one path associated with the first web origin, the at least one path associated with the first web origin corresponding with respective content, of the first web origin, for use with the web-based application;
          a second web origin for the web-based application; and at least one path associated with the second web origin, the at least one path associated with the second web origin corresponding with respective content, of the second web origin, for use with the web-based application; and applying features of the web-based application for content within the web extent.

15. The non-transitory recordable storage medium of claim 14, wherein:

the first web origin comprises a first Uniform Resource Locator (URL); and the second web origin comprises a second URL.

16. The non-transitory recordable storage medium of claim 14, wherein implementing the web-based application further comprises implementing one or more permissions for the web-based application, wherein the one or more permissions are applied for content within the web extent.

17. The non-transitory recordable storage medium of claim 14, wherein implementing the web-based application further comprises launching, by the computing device, the web-based application in response to the computing device browsing to content within the web extent.

* * * * *